United States Patent [19]
Tingley

[11] Patent Number: 6,051,301
[45] Date of Patent: *Apr. 18, 2000

[54] REINFORCED WOOD STRUCTURAL MEMBER USING CELLULOSE BOND LINE INTERFACE MATERIAL

[76] Inventor: Daniel A. Tingley, 3310 SW. Willamette Ave., Corvallis, Oreg. 97333

[ * ] Notice: This patent is subject to a terminal disclaimer.

[21] Appl. No.: 08/857,914

[22] Filed: May 16, 1997

Related U.S. Application Data

[60] Division of application No. 08/206,411, Mar. 4, 1994, Pat. No. 5,641,553, which is a continuation-in-part of application No. 08/037,580, Mar. 24, 1993, Pat. No. 5,362,545.

[51] Int. Cl.$^7$ ...................................................... B32B 5/12

[52] U.S. Cl. .......................... 428/106; 428/107; 428/109; 428/113; 428/114; 428/326; 428/479.6

[58] Field of Search ................................... 428/105, 106, 428/107, 109, 113, 114, 326, 479.6

[56] References Cited

U.S. PATENT DOCUMENTS

| | | | |
|---|---|---|---|
| 2,536,183 | 1/1951 | Jamieson | 428/525 |
| 2,983,629 | 5/1961 | Anderson et al. | 428/541 |
| 3,413,188 | 11/1968 | Allen | 161/195 |
| 3,519,476 | 7/1970 | Bremmer et al. | 428/541 |
| 3,616,370 | 10/1971 | Jennings | 522/139 |
| 3,669,727 | 6/1972 | Raymond et al. | 428/541 |
| 3,684,649 | 8/1972 | Shelton | 428/541 |
| 3,890,077 | 6/1975 | Holman | 425/111 |
| 4,061,620 | 12/1977 | Grillern | 428/541 |

(List continued on next page.)

FOREIGN PATENT DOCUMENTS

| | | |
|---|---|---|
| 397502 | 12/1989 | Japan . |
| 4149346 | 5/1992 | Japan . |

OTHER PUBLICATIONS

Rowlands et al., "Fiber–Reinforced Wood," *Wood and Fiber Science*, Jan. 1986, v. 18(i), pp. 39–57.

Wood Design Focus, A Newsletter of Contemporay Wood Engineering, vol. 4, No. 2, Summer 1993, R. J Leichi, Editor.

Von de Kuilen, Proceedings of the 1991 International Timber Engineering Conference, vol. 3, Sep. 2–5, 1991, pp. 226–233.

Tingley, Reinforced Glued–Laminated Wood Beams, 1988.

Tingley, Proceedings of the 1988 International Conference on Timber Engineering, vol. 1, Sep. 19–22, 1988, pp. 422–427.

Tingley, Reinforced Glued–Laminated Wood Beams, 96 page Thesis accepted Nov., 1987 by the University of New Brunswick (Canada) as partial fulfillment for M.S. Eng., Dept. of Civil Engineering.

Tingley, "Predicting Strength Criteria for Kevlar and Fiberglass Reinforced Plastic (KRP & FRP) Glued Laminated Beams," pp 301–304 from vol. 2 of the Proceedings of the Second Pacific Eng. Conf., 1989.

*Primary Examiner*—Jenna Davis
*Attorney, Agent, or Firm*—Stoel Rives LLP

[57] ABSTRACT

A reinforcement panel with a cellulose surface material improves adhesion of the panel to one or more wood segments in wood structural members such as laminated beams, wood I-beams, and trusses to provide a cellulose material-to-wood segment interface that withstands high shear stresses. The reinforcement panel is comprised of a plurality of reinforcement fibers that are preferably arranged parallel to one another and aligned with the longitudinal direction of the panel, and accordingly the wood structure. The fibers are maintained in position by a resin encasement that completely encloses the fibers. A cellulose surface material is impregnated with a polyester resin and adhesively connected to a first side of the panel. The first side of the panel is adhesively affixed to the wood structure at an area of high stress such that the surface material is sandwiched between the resin encasement of the panel and the wood structure. Thus, the panel provides improved adhesion. The polyester resin provides dimensional stability and resistance to moisture degradation.

13 Claims, 3 Drawing Sheets

U.S. PATENT DOCUMENTS

| | | | |
|---|---|---|---|
| 4,108,351 | 8/1978 | Hough | 229/62 |
| 4,242,406 | 12/1980 | El Bouhnini et al. | 428/236 |
| 4,312,162 | 1/1982 | Medney | 52/309.16 |
| 4,337,290 | 6/1982 | Kelly et al. | 428/201 |
| 4,371,579 | 2/1983 | McCaskey et al. | 428/204 |
| 4,615,163 | 10/1986 | Curtis et al. | 52/730 |
| 4,965,973 | 10/1990 | Engebretsen | 52/223 R |
| 5,000,808 | 3/1991 | Deviney | 156/178 |
| 5,006,390 | 4/1991 | Kavesh et al. | 423/105 |
| 5,026,593 | 6/1991 | O'Brien | 428/215 |
| 5,135,793 | 8/1992 | Socha | 428/74 |

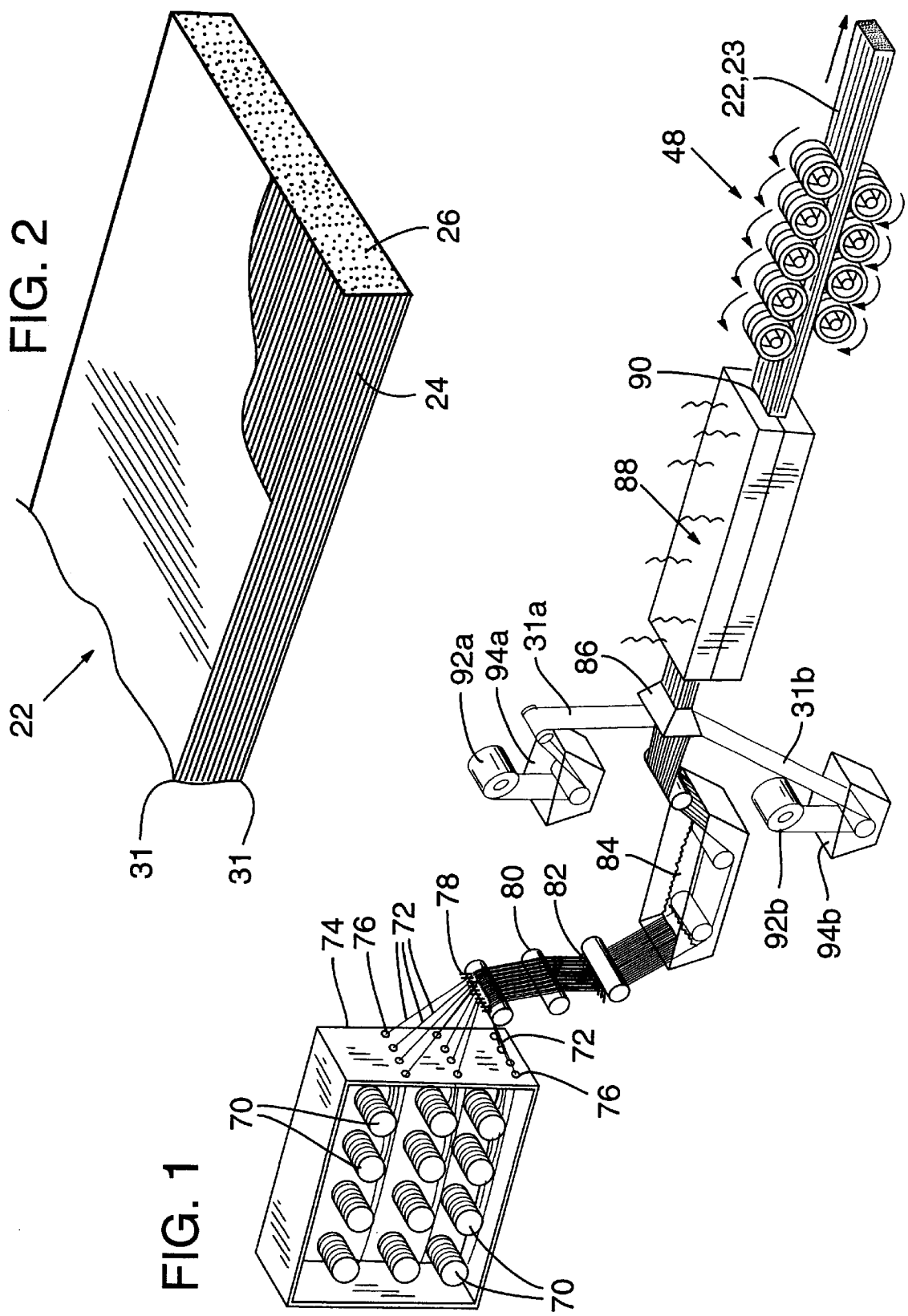

REINFORCED WOOD STRUCTURAL MEMBER USING CELLULOSE BOND LINE INTERFACE MATERIAL

This is a division of application Ser. No. 08/206,411, filed Mar. 4, 1994, now U.S. Pat. No. 5,641,553 which is a continuation-in-part of application Ser. No. 08/037,580, filed Mar. 24, 1993, now U.S. Pat. No. 5,362,545.

FIELD OF THE INVENTION

This invention pertains to reinforced structural wood members, such as beams, columns and trusses. More particularly, the present invention pertains to the use of reinforcement panels having a cellulose surface material for improved adhesion to structural wood members.

BACKGROUND OF THE INVENTION

To remain competitive, wood product engineers have had to adopt innovative designs in combination with alternative materials to enhance the structural limits and cost effectiveness of engineered wood products. Examples of engineered wood products include glued laminated wood beams, laminated wood columns, wood I-beams, and wood trusses. The prior art is replete with examples of these engineered wood products.

The preferred method for fabrication of engineered wood products is to connect wood boards with a resorcinol-formaldehyde resin. Resorcinol-formaldehyde is the preferred adhesive because it is low cost, workable, and has a lower toxicity, particularly as compared to epoxy resins.

To improve the effectiveness of engineered wood products, recent studies have looked at using high strength fiber panels as reinforcement. At a 1988 International Conference on Timber Engineering a paper was presented entitled "Reinforced Glued-Laminated Wood Beams" by Mr. Dan A. Tingley (hereinafter "Tingley Paper") that disclosed the use of reinforced plastics (RP) in glued-laminated wood beams (glulams). The Tingley paper disclosed test results of glulams using aramid fibers sold under the trademark KEVLAR for reinforced plastic panel(s) located at high stress areas. The results indicated a 19% improvement in ultimate load-to-failure of beams with KEVLAR reinforcement as opposed to nonreinforced beams. However, the Tingley paper does not disclose a method for using resorcinol-formaldehyde resin ("resorcinol") as an adhesive for the RP to wood laminae connection. On the contrary, the Tingley paper teaches away from using resorcinol adhesives by teaching the use of epoxies to adhere the RP to the surrounding wood laminae even though the less expensive commercial adhesive, resorcinol, was used between the other layers of wood laminae.

One method for the attachment of an RP to engineered wood products using resorcinol was disclosed in a parent to the present application, which disclosed the use of fiber-based panels wherein some of the fibers have ends along the length of the panel that protrude from a resin encasement to provide a surface to which resorcinol can bond. Generally, such a panel is created by abrading its surface to create protruding fibers which can then be adhesively adhered to a wood structure. However, many materials are not suitably abradable to create the fiber-protruding surface. Most notable are reinforcement panels constructed using carbon or glass fibers.

What is desired, therefore, is a reinforcement panel that can be adhesively adhered to the wood structure, preferably in the same manner as the wood laminae themselves are adhered together, without the need for abrading its surface. Further, such a panel should be resistant to moisture degradation and have dimensional stability. Moisture degradation generally refers to the ability of a material to maintain its integrity when subjected to moisture. Dimensional stability generally refers to the ability of a material to resist shrinking or expanding when subjected to stresses.

Another area of related art is the fabrication process of pultrusion. Pultrusion, shown in FIG. 7, is defined as a continuous manufacturing process for producing lengths of fiber reinforced plastic parts. Pultrusion entails pulling flexible reinforcing fibers through a liquid resin bath and then through a heated die where the plastic part is shaped and the resin is cured. Pultrusion is known for its ability to fabricate a continuous length of reinforced plastics and to accommodate custom placement and orientation of fibers, which allows for the mechanical properties of the pultruded part to be designed for a specific application.

SUMMARY OF THE INVENTION

The present invention overcomes the foregoing drawbacks of the prior art by providing a reinforcement panel having a plurality of reinforcement fibers embedded in a resin encasement and having an adhesively connected cellulose surface material that is impregnated with a polyester resin. The reinforcement panel is adhesively affixed to a wood structure at an area of high stress such that the surface material is sandwiched between the resin encasement and the wood structure.

Cellulose surface materials, such as paper or wood, impregnated with a polyester resin have dimensional stability and are resistant to moisture degradation. Further, cellulose surface materials have a surface similar to that of the wood members and therefore provides improved adhesion of the panel to the wood structure, preferably with an inexpensive adhesive such as resorcinol.

A reinforcement panel having superior adhesion properties is manufactured by encasing a plurality of reinforcement fibers in a resin encasement and impregnating a cellulose surface material with a polyester resin. The surface material is adhesively connected to a first side of the panel. A wood structure is created by adhesively connecting a plurality of wood members. Thereafter, the reinforcement panel is adhesively affixed to the wood structure at an area of high stress such that the surface material is sandwiched between the resin encasement and the wood structure.

Preferably, the wood structure comprises a plurality of wood laminae adhesively connected and further including connecting adhesively a second cellulose surface material to a second side of the panel, and adhesively affixing the panel between an outermost lamina and an adjacent lamina.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a perspective view of a pultrusion process of the present invention which produces an elongate reinforcement panel having substantially all of its fibers arranged parallel to one another and aligned with a longitudinal axis and including a cellulose surface material adhesively attached to each side of the panel.

FIG. 2 is a perspective view of a portion of a panel of the present invention wherein a cut-away view shows the alignment and orientation of the fibers which comprise the panel and the cellulose surface material.

DETAILED DESCRIPTION OF PREFERRED EMBODIMENTS

Figure 3:
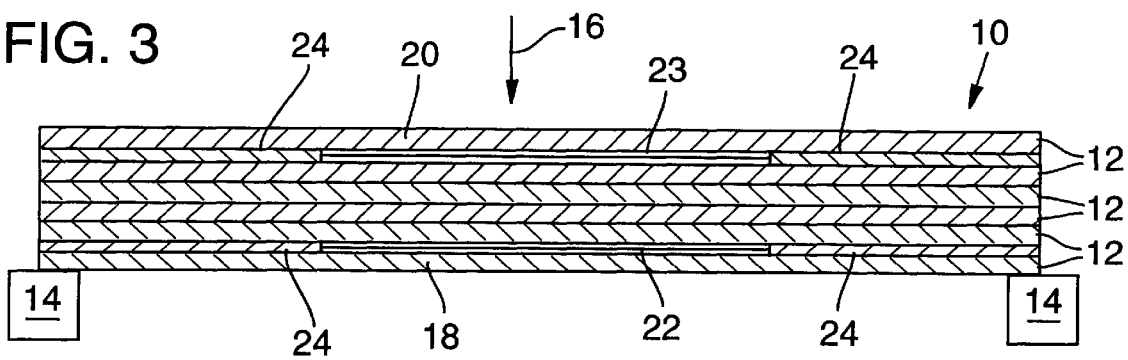
FIG. 3 is an elevation view of a wood laminated beam having reinforcing panels of the present invention located between the laminae.
Figure 4:
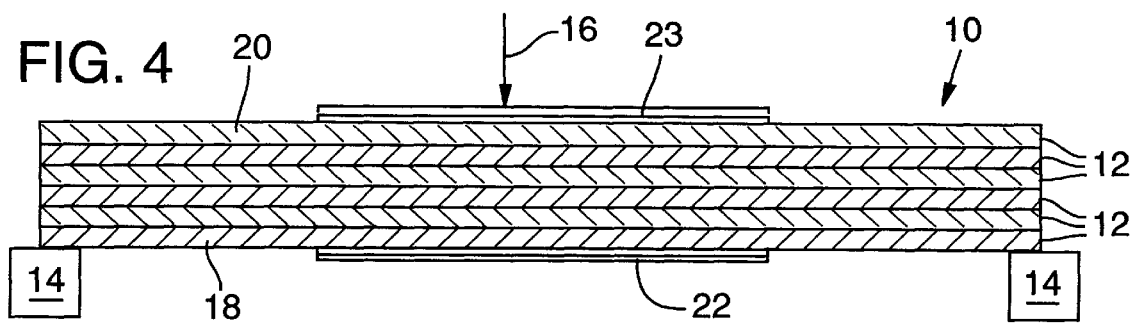
FIG. 4 is an elevation view of a wood laminated beam having reinforcing panels of the present invention located on exterior surfaces thereof.

The present invention is best understood by beginning with a description of its use. With reference to FIGS. 3 and 4 there is shown a wood structure having a plurality of elongate wood members adhesively connected together, which is generally referred to as a glued-laminated wood beam (glulam) 10 with a plurality of lamina 12.

A primary structural use of laminated beams is to span an open area, represented as an area between blocks 14, and to support a load as represented by arrow 16. When thusly configured, the lowermost lamina 18 is subjected to a substantially pure tensile stress. Conversely, the uppermost lamina 20 is subjected to a substantially pure compressive stress. Researchers have found that the load-bearing capacity of laminated beams may be substantially increased by adding reinforcing panels 22 and 23 in the areas of greatest stress; namely, closest to the lowermost lamina 18 or uppermost lamina 20. Reinforcing panel 22 is distinguished from reinforcing panel 23 because panel 22 is designed for, and located at, areas of high tensile stress, whereas panel 23 is designed for and located it areas of high compressive stress. In FIG. 3 the reinforcing panel 22 is shown between the lowermost lamina 18 and its adjacent lamina and the panel 23 is shown between the uppermost lamina 20 and its adjacent lamina. In FIG. 4 the reinforcing panels 22 and 23 are shown on the outside of respective lamina 18 and 20.

In FIGS. 3 and 4 the length of the reinforcing panel is approximately three-fifths of the beam length. Testing has shown, and been disclosed in the prior art, that a reinforcing panel which covers two-fifths to three-fifths of the central portion of the beam provides substantially all the benefit of a full-length reinforcing panel, but at a lower cost per beam. In FIG. 3 the reinforcing panel is mounted between adjacent lamina and extends approximately three-fifths of the length of the beam, thus requiring spacers 24 to be located adjacent the ends of the reinforcement panel 22. The spacers 24 are preferably made of wood. When the reinforcing panel is located on the exterior of the beam, as in FIG. 4, no spacers are required.

It is within the scope of the present invention that the reinforcement panels could alternatively be affixed to the side of the glue laminated wood beam 10 on the side of one or more lamina 12.

Figure 5:
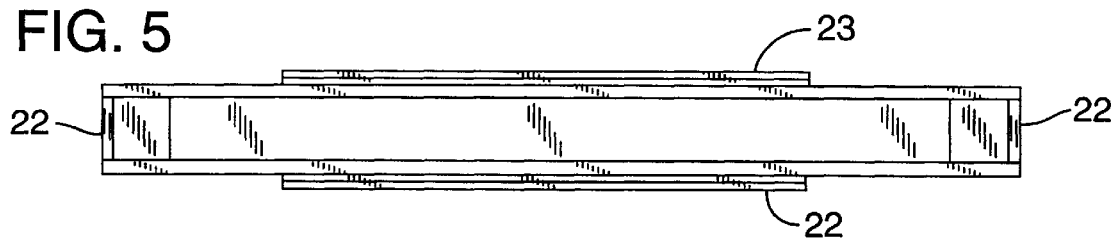
FIG. 5 is an elevation view of a wood I-beam showing preferred locations of reinforcing panels of the present invention for improving the load-carrying capacity of the I-beam.
Figure 6:
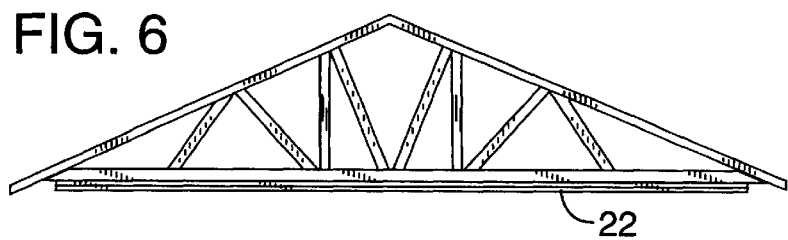
FIG. 6 is an elevation view of a wood truss showing a preferred location for a reinforcing panel of the present invention for improving the load-carrying capacity of the truss.

FIG. 5 shows a wood I-beam having reinforcing panels along the top, the bottom, and on the web portions at the distal ends. FIG. 6 shows a wood truss having a reinforcing panel 22 mounted at the location of highest tensile stress. FIGS. 3–6 are included herein to show some applications of the reinforcing panel of the present invention and are not intended to include all applications for all types of wood structures for which the reinforcing panel of the present invention is suitable. It is to be understood that the reinforcing panels of the present invention are also suitable for solid wood beams and columns, and other engineered wood structures, such as laminated veneer lumber and parallel strand lumber sold under the trademark PARALLAMS.

The preferred embodiment of the reinforcing panel of the present invention is shown in FIG. 2. The panel 22 comprises a plurality of synthetic fibers 24 substantially continuous along the length of the panel and arranged substantially parallel to one another and substantially aligned with a longitudinal direction of the panel. The fibers 24 are maintained in their arrangement and alignment by a resin encasement 26 that surrounds the fibers and fills the interstices between the fibers. The panel 22 further includes at least one cellulose surface material 31 adhesively affixed to its surface, as described below, to facilitate improved adhesion of the panel to a wood structure such as the glulam 10. Because it is affixed to the surface of panel 22, cellulose surface material 31 is not present in the interior of panel 22. As used herein, resin refers to a class of solid or semi-solid organic products of natural or synthetic origin with no definite melting point, generally of high molecular weight. Most resins are polymers.

The parallel arrangement and longitudinal alignment of the fibers 24 provides a panel having maximum strength because the strength comes from the fibers (not the resin). Commonly, reinforced plastic parts have a fiber to resin volume ratio of 40/60. The configuration of fibers in the parent invention permits fiber to resin volume ratios as high as 60/40 when fabricated by the pultrusion method. Furthermore, in fabricating reinforced plastic parts it is very important that the resin fully impregnates the reinforcing fibers, known as wetting. One hundred percent wetting is difficult to achieve with fibers configured in a complicated weave. However, by providing a parallel fiber configuration it is possible to achieve 100% wetting even with high fiber to resin ratios. When constructed of wood, the cellulose surface material 31 of the present invention provides additional transverse strength to the panel permitting an even higher fiber-to-resin volume ratio of approximately 65/35, therefore permitting more fibers to be used in the panel creating an even stronger panel.

Previously, reinforced plastic panels were adhered to wood structures with epoxy because of its superior adhesive properties. However, epoxy, as compared to polyester resins and particularly resorcinol, is difficult to work with, more expensive and more toxic. Therefore, it is preferable to use resorcinol for all bonds between wood structure members. To permit the use of a non-epoxy adhesive, such as resorcinol, with the plastic reinforcement panel 22, the cellulose surface material 31 is adhesively affixed to one or both sides of the panel 22. Resorcinol and other similar adhesives bond with what can be described as a physical bond to the surface of a material, and thus creates a much stronger bond with a surface that is textured, such as a wood or paper surface. Therefore, by using a cellulose surface material 31 which is similar to the lamina 12, resorcinol will make a substantially equivalent bond between the cellulose surface material 31 and the lamina 12, as it would between wood laminae 12. Further, with a wood surface material-to-lamina bond, the wood surface is not adhered to the lamina with a different material and therefore complying with governmental code regulations is simplified. Code regulations already exist for bonding wood to wood so new code regulations would not need to be developed for a wood surface material-to-lamina bond, as would be required for many other materials.

When the panel is sandwiched between two lamina 12, as shown in FIG. 3, then the cellulose surface material 31 is affixed to both sides of the panel 22. In contrast, if the panel 22 is not sandwiched between lamina 12, as shown in FIG. 4, then the cellulose surface material 31 needs to be on only the side of the panel 22 being adhesively adhered to the wood structure.

Under loaded conditions of the wood structure, the panel 22 and associated cellulose surface materials 31 will be exposed to high interlaminar shear stresses. Due to such high stresses, the cellulose surface material 31 needs to be treated to maximize its dimensional stability. If the panel 22 or cellulose surface material 31 had low dimensional stability, then the wood structure in which the panel 22 is attached would have less strength than that of a wood structure having a panel with high dimensional stability. Further, wood structures are often subjected to moisture that could impregnate the cellulose surface material 31 causing moisture degradation of the cellulose surface material 31. Moisture degradation may lead to the failure of the interlaminar adhesion causing failure of the wood structure.

To provide a panel with improved adhesion while providing both dimensional stability and protection against moisture degradation, the cellulose surface material 31 is impregnated with a polyester resin. The specific polyester resin is chosen such that it will impregnate the surface material 31 within a relatively short time. It is apparent that depending upon the specific polyester resin chosen, and the type and thickness of the cellulose surface material 31, the length of time required for adequate penetration will vary considerably. A preferred polyester resin is the orthoresin diallyh phthalate (DAP), which has a sufficiently low molecular weight and viscosity to provide adequate impregnation of the cellulose surface material 31 within a reasonable time. Preferably, the cellulose surface material 31 impregnated with DAP is co-cured at the same time as the panel 22 is cured. Other polyester resins, such as polyester and polyester with styrene, are also acceptable for impregnating the cellulose surface material 31.

Alternatively, the surface material 31 can be adhesively adhered to the panel 22 without previously impregnating it with the polyester resin by applying the cellulose surface material 31 directly onto the wet resin-soaked fibers of the panel 22 and partly embedding it in the resin encasement. In this manner, the resin will impregnate the cellulose surface material 31, thereby providing dimensional stability and resistance to moisture degradation.

Another alternative is to use a polyester resin impregnated cellulose surface material 31 and adhesively adhering it to the panel 22 after the panel 22 has been previously cured, generally referred to as a post cure process.

Irrespective of the particular method chosen, the exposed side of the cellulose surface material 31 provides improved adhesion characteristics for adhering the panel 22 to the wood structure which provides a previously unknown means for adhering reinforced plastic panels to wood structures by means of nonepoxy adhesives.

A preferred cellulose fiber material is a 60-lb weight, no-wax Kraft paper, though any type of paper of suitable weight, such as 30–90 lb paper, could also be used.

Another preferred cellulose surface material is a soft wood, such as Radiatta or Ponderosa pine, though other types of wood are also acceptable. The wood is preferably a sliced or rotary cut veneer as opposed to using a veneer with a sanded surface, because sanding creates a surface that is difficult to obtain an adequately strong bond with an adhesive, such as resorcinol. Preferably, the individual pieces of the wood veneer are held together by finger joints mounted on a polyester mat backing sheet, or alternatively, tape, with the polyester side toward the panel 22. The wood surface material is preferably $2/100$ of an inch thick, but a general range of $1/100$ to $25/100$ of an inch thick is also acceptable. Depending upon the actual polyester resin used, the thickness of the cellulose surface material is preferably such that the polyester resin fully impregnates the cellulose surface material to provide maximum resistance to moisture degradation and dimensional stability, while providing improved adhesion characteristics.

The panel shown in FIG. 2 is a preferred embodiment of a panel to be used to reinforce the areas of a wood beam 10 subjected to high tension stresses. Preferably, the fibers 24 would be aramid fibers or carbon fibers. Aramid fibers are commercially available under the trademark KEVLAR, and the preferred grade of fibers for the present invention is available under the trademark KEVLAR 29. Alternatively, the fibers would be a high modulus polyethylene which is sold commercially under the trademark SPECTRA.

Preferably, the resin 26 used in the fabrication of the panel is an epoxy. However, alternative embodiments could use other polymers such as polyesters, vinyl esters, phenolic resins, polyimides, or polystyrylpyridine (PSP). Alternative embodiments of the present invention could use thermoplastic polymers such as poly(ethyleneterephthalate) (PET) and nylon-66.

Fabrication of the Reinforcing Panel

As discussed in the prior art, pultrusion is a fabrication process wherein flexible reinforcing fibers are wetted in resin and pulled through a heated die to cure the resin which encases the fibers.

Figure 7:
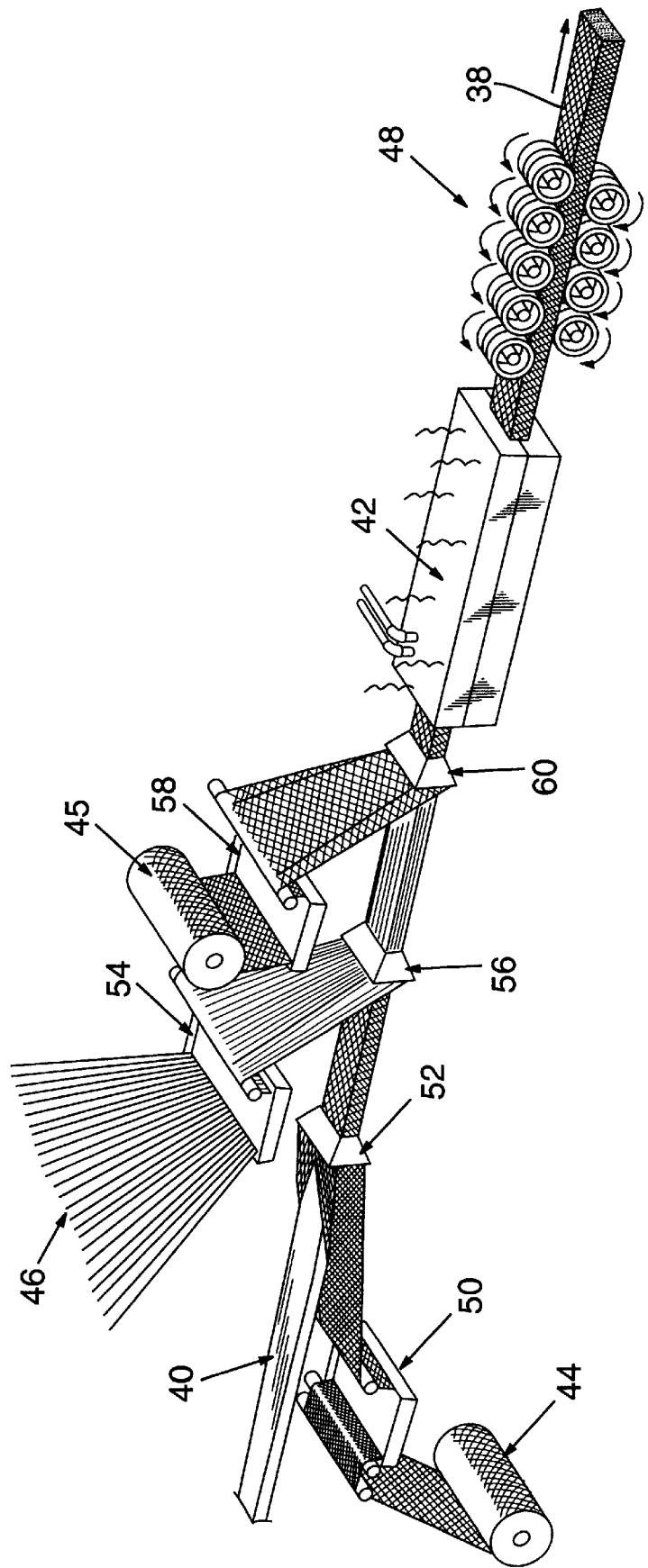
FIG. 7 is a perspective view of a pultrusion process of the prior art.

With reference to FIG. 7 the prior art pultrusion process will be explained. The pultrusion process, as shown in FIG. 7, is set up to fabricate a hollow rectangular section member thus requiring a mandrel 40 to maintain the hollow core during the pultrusion process. The pultrusion process comprises upper and lower mats 44, 45 respectively, that are typically woven rovings or woven fabric. There is also a plurality of rovings 46 that are formed and sandwiched between the woven mats. Puller 48 provides the force that pulls the fibers through the process. Thus, beginning with lower woven mat 44, the mat is pulled through a resin bath 50 and formed around the mandrel 40 by the forming die 52. The rovings 46 are likewise wetted in a resin bath 54 and formed around the mandrel/mat combination by forming die 56. Thereafter, the upper woven mat 45 is wetted in a resin bath 58 and formed around the combination of the mandrel 40, lower mat 44, and rovings 46 by forming die 60. The entire combination is pulled through heated die 42 which cures the resin so that a structural member 38 emerges from the die as a rigid member 38. To fabricate a solid member, the prior art pultrusion process would be modified by eliminating the mandrel 40.

Referring to FIG. 1, the present invention improves upon the pultrusion process of the prior art for the purpose of fabricating the reinforcing panel 22 (or 23) of the present invention. Beginning with a plurality of bobbins 70 having synthetic fiber rovings 72 thereon, the rovings are pulled through a card 74 for alignment and to prevent entanglement of the rovings. The card 74 has a plurality of openings 76 through which the rovings 72 pass. The openings 76 are typically gasketed with a low friction material such as a ceramic or plastic to prevent any abrasion or resistance to the rovings 72 from the edges of the openings. After the rovings 72 pass through the card 74, the rovings are gathered and arranged parallel to one another by a first comb 78. After the first comb, the rovings pass over a tensioning mandrel 80 and under a second comb 82 which further maintains the parallel arrangement of the rovings 72. Thereafter, the rovings are wetted in a resin bath 84 and gathered by a forming die 86 prior to entering a heated die 88 having an orifice 90 that shapes the panel 22 (or 23). Heat from the die 88 cures the resin so that the panel 22 which emerges is a substantially rigid member. Cellulose surface materials 31*a* and 31*b* stored on respective rolls 92*a* and 92*b* are located above and below the forming die 86. The surface materials 31*a* and 31*b* are impregnated with a polymer resin in respective polymer resin baths 94*a* and 94*b*. Thereafter, both cellulose surface materials 31*a* and 31*b* feed into the forming die 86, are pressed into contact with the wetted fibers, and are co-cured with the panel 22. The tension on the surface materials 31*a* and 31*b*, is 2–3 pounds to maintain tension. The preferred rate of curing is 2–3 feet per minute, though rates from at least 6 inches per minute to 5 feet per minute are possible.

Alternatively, as previously mentioned, the cellulose surface material, after impregnation with a polymer resin, could be adhesively adhered in a post-cure process to a previously cured panel. As such, the cellulose surface material would be adhesively connected to the panel, preferably by passing the cured panel and wet impregnated cellulose surface material through a heated curing die.

Another alternative, as previously mentioned, involves eliminating the polyester resin baths 94*a* and 94*b* and co-curing the cellulose surface material with the panel while permitting the resin from the panel to impregnate the cellulose surface material.

The terms and expressions which have been employed in the foregoing specification are used herein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A reinforced wood laminate structural member built to bear large load forces applied over the span of an open area and withstand high interlaminar shear stresses to maintain the load-bearing capacity of the structural member, the structural member having a longitudinal axis and comprising:

plural elongate wood segments attached to form a unitary structure, at least one of the wood segments having a length extending along the longitudinal axis;

a fiber reinforcement having a length and including a multiplicity of fiber strands held within a resin casing having first and second major surfaces; and cellulose surface material having a resin-impregnated surface bonded to one of the first and second major surfaces of the resin casing of the fiber reinforcement and adhered to one of the wood segments to provide a cellulose surface material-to-wood segment interface that withstands high shear stresses and thereby maintains the load-bearing capacity of the structural member, the fiber reinforcement being positioned so that its length extends along the longitudinal axis of the structural member.

2. The wood structural member of claim 1 in which the wood segments form wood laminae that include an outermost lamina having an outside surface, the cellulose material bonded to one of the first and second major surfaces of the resin casing of the fiber reinforcement being adhered to the outside surface of the outermost lamina.

3. The wood structural member of claim 1 in which the wood segments form wood laminae and the resin casing of the fiber reinforcement has cellulose surface material bonded to each of the first and second major surfaces and is adhered in position between an adjacent pair of wood laminae.

4. The wood structural member of claim 3 in which the wood laminae include an outermost lamina that is one of the pair of wood laminae.

5. The wood structural member of claim 1 in which the cellulose surface material is partly embedded in the resin casing.

6. The wood structural member of claim 1 in which the cellulose surface material is impregnated with diallyh phthalate.

7. The wood structural member of claim 1 in which the cellulose surface material includes paper or wood.

8. The wood structural member of claim 1 in which the one of the first and second major surfaces of the fiber reinforcement to which cellulose surface material is bonded is adhered to the wood structure with a phenol-formaldehyde resin.

9. The wood structural member of claim 1 in which the one of the first and second major surfaces of the fiber reinforcement to which cellulose surface material is bonded is adhered to the wood structure with a non-epoxy adhesive.

10. The wood structural member of claim 1 in which the wood segments and the fiber reinforcement are adhered together by an adhesive to form multiple adhesive interlaminar interfaces, the adhesive in any one of the adhesive interlaminar interfaces being the same as that in the remaining adhesive interlaminar interfaces.

11. The wood structural member of claim 1 in which the fiber strands include aramid fiber strands, carbon fiber strands, fiberglass fiber strands, or high modulus polyethylene fiber strands.

12. The wood structural member of claim 1 in which the wood segments form a glue laminated wood beam, a wood I-beam, a wooden truss, a laminated veneer, or parallel strand lumber.

13. The wood structural member of claim 1 in which the fiber strands are arranged substantially parallel to one another and extend along the length of the fiber reinforcement.

* * * * *